United States Patent [19]

Hums

[11] Patent Number: 4,880,378

[45] Date of Patent: Nov. 14, 1989

[54] COMBUSTION PLANT WITH A DEVICE FOR REDUCING NITROGEN OXIDES IN FLUE GASES

[75] Inventor: Erich Hums, Erlangen, Fed. Rep. of Germany

[73] Assignee: Siemens Aktiengesellschaft, Berlin and Munich, Fed. Rep. of Germany

[21] Appl. No.: 100,748

[22] Filed: Sep. 24, 1987

[30] Foreign Application Priority Data

Sep. 30, 1986 [DE] Fed. Rep. of Germany ....... 3633285

[51] Int. Cl.⁴ .............................................. F23D 19/00
[52] U.S. Cl. ....................................... 431/170; 431/7; 422/180
[58] Field of Search ..................... 431/170, 7; 422/180

[56] References Cited

U.S. PATENT DOCUMENTS 4,067,190  1/1978  Hamm et al. ................... 431/170 X

*Primary Examiner*—Larry Jones
*Attorney, Agent, or Firm*—Herbert L. Lerner; Laurence A. Greenberg

[57] ABSTRACT

A combustion plant having a device for reducing nitrogen oxides in flue gases, includes an injection device for injecting a gaseous reducing agent, and a catalyst arrangement disposed downstream of the injection device in flow direction of the flue gases, and being formed with a catalyst containing elements of the iron group subjectible to a flue gas temperature in excess of 600° C.

16 Claims, 1 Drawing Sheet

COMBUSTION PLANT WITH A DEVICE FOR REDUCING NITROGEN OXIDES IN FLUE GASES

The invention relates to a combustion plant having a device for reducing nitrogen oxides in flue gases including an injection device for injecting a gaseous reducing agent and a catalyst arrangement disposed downstream of the injection device.

Combustion plants having become known heretofore wherein ammonia is injected into a flue gas conduit, the flue gas thus enriched with ammonia being directed through a catalyst arrangement, based mostly on catalyst containing titanium oxide or vanadium oxide, so-called SCR catalysts.

In these heretofore known combustion plants, the SCR catalysts reduce the nitrogen oxides NO and $NO_2$ to $H_2O$ and $N_2$ with the aid of the ammonia which serves as reducing agent. Thus, nitrogen oxides can sometimes be reduced to values below the limits prescribed by the emission laws. It is a peculiarity of such plants that the technical effort which must be employed to reduce the nitrogen oxides is rather marked. A method for removing nitrogen oxides from combustion exhaust gases is known from German Published, Non-Prosecuted Application DE-OS No. 26 01 077 (corresponding to U.S. Pat. No. 4,129,651), in which the ammonia is supplied to the exhaust gas at location where the temperature is in excess of 700° C., and is there directed over metallic surfaces, particularly heat exchanger surfaces, containing vanadium components. This method is distinguished by a clearly reduced technical expense. However, the degree of nitrogen oxide removal is lower than in the other methods for reducing nitrogen oxides.

From German Published Non-Prosecuted Application DE-OS No. 34 41 141, a method for non-catalytic reduction of nitrogen oxides by means of ammonia in a fluidized bed burner has also become known. Catalysts are not used there, and the ammonia is admixed to the air flowing into the fluidized bed. An advantage of this method is that old plants or installations can be retrofitted without great expense and that the technical expense which is required is relatively small. However, this type of reduction of nitrogen oxides requires careful monitoring of the flame temperature. If the flame temperature is too high, additional nitrogen oxides are created because of the decomposition of the ammonia and the oxidation thereof in the flame. Even with flame temperatures around and below 800° C., the degree of nitrogen oxide removal leaves something to be desired with this method.

From German Pat. Nos. 641 596 and 666 062, a method of combustion of $NH_3$ is known in which the progress of the reaction has been selected so that a mixture of $N_2$ and $H_2$ free of $O_2$ and nitrogen oxide can be obtained. In this method, the formation of hydrogen gas can be controlled within wide limits by admixing air. In this regard, an iron-nickel-chromium catalyst is introduced above 700° C.

It is accordingly an object of the invention to provide a device for reducing as much as possible the nitrogen oxides in flue gases of combustion plants in as simple a manner as possible without having to content with other undesired gas contamination.

With the foregoing and other objects in view, there is provided, in accordance with the invention, a combustion plant having a device for reducing nitrogen oxides in flue gases, comprising an injection device for injecting a gaseous reducing agent, and a catalyst arrangement disposed downstream of the injection device in flow direction of the flue gases, and being formed with a catalyst containing elements of the iron group subjectible to a flue gas temperature in excess of 600° C.

In accordance with another feature of the invention, the catalyst is formed of a metal alloy.

In accordance with a further feature of the invention, the metal alloy has an additive formed of chromium.

In accordance with in additional feature of the invention, the catalyst is formed at least predominantly of nickel.

In accordance with an added feature of the invention, the catalyst consists of material shaped as wires.

In accordance with yet another feature of the invention, the catalyst consists of material shaped as chips.

In accordance with yet a further feature of the invention, the catalyst consists of material shaped as mesh.

In accordance with yet an additional feature of the invention, the catalyst contains an oxide of at least one of the metals iron, nickel and chromium.

In accordance with yet an added feature of the invention, the catalyst is disposed in a combustion chamber of the combustion plant.

In accordance with an alternate feature of the invention, the injection device is disposed in a combustion chamber of the combustion plant.

In accordance with still another feature of the invention, the injection device is connected to a combustion air conduit leading to a combustion chamber of the combustion plant.

In accordance with still a further feature of the invention, there is provided, a flue gas conduit leading to a chimney and located downstream in the flow direction of the flue gases from a heat source for heating the flue gases to a temperature above 600° C., the catalyst being disposed in the flue gas conduit.

In accordance with still an additional feature of the invention, there is provided, another catalyst disposed in the flue gas conduit upstream of the first-mentioned catalyst in the direction of flow of the flue gases for removing nitrogen oxides, the other catalyst containing an oxide of at least one of the metals titanium and vanadium.

In accordance with still an added feature of the invention, the heat source is a heat exchanger.

In accordance with again another feature of the invention, the heat source is a small combustion plant.

In accordance with again a further feature of the invention, there are provided, means for controlling, in an inverse ratio to the temperature of the other catalyst, the oxygen content of the flue gases which flow to the other catalyst in dependence upon the temperature of the other catalyst.

In accordance with again an additional feature of the invention, there are provided, means for injecting air into the flue gases.

In accordance with again an added feature of the invention, the heat source has a flame temperature which is at most 800° C.

In accordance with a further feature of the invention, there is provided also a fluidized bed.

In accordance with another feature of the invention, both of the catalysts are at a temperature which is at most 1.300° C.

In accordance with a concomitant feature of the invention, the reducing agent is at least one of the gases ammonia, carbon monoxide and hydrogen.

Because a catalyst containing elements of the iron group is used, the result is a cost advantage in comparison to most other catalyst systems. Additionally, a material is used which does not cause problems in the subsequent disposal of the spend catalyst which, furthermore, can be reprocessed. These elements exhibit favorable catalytic action when introduced in a temperature range above 600° C. during the transformation of ammonia and nitrogen oxide to water vapor, hydrogen and nitrogen.

It is possible to attain a particularly good insensitivity of the catalyst to the abrasive action of dust and ash particles if, in a particularly advantageous improvement of the invention, a catalyst formed of a metal alloy is used. In such a case, the catalytic activity does not change if the surface parts of the catalyst are eroded. The sensitivity of the catalyst to temperature can be clearly improved if, in a further development of the invention, chromium is added to the alloy. Therefore, its range of application can be broadened so that it can be installed directly into the combustion chamber of boiler plants.

Quite good catalytic activity can also be achieved if, in another development of the invention, a catalyst generally formed of nickel is used.

Other features which are considered as characteristic for the invention are set forth in the appended claims.

Although the invention is illustrated and described herein as embodied in combustion plant with a device for reducing nitrogen oxides in flue gases, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

Figure 1:
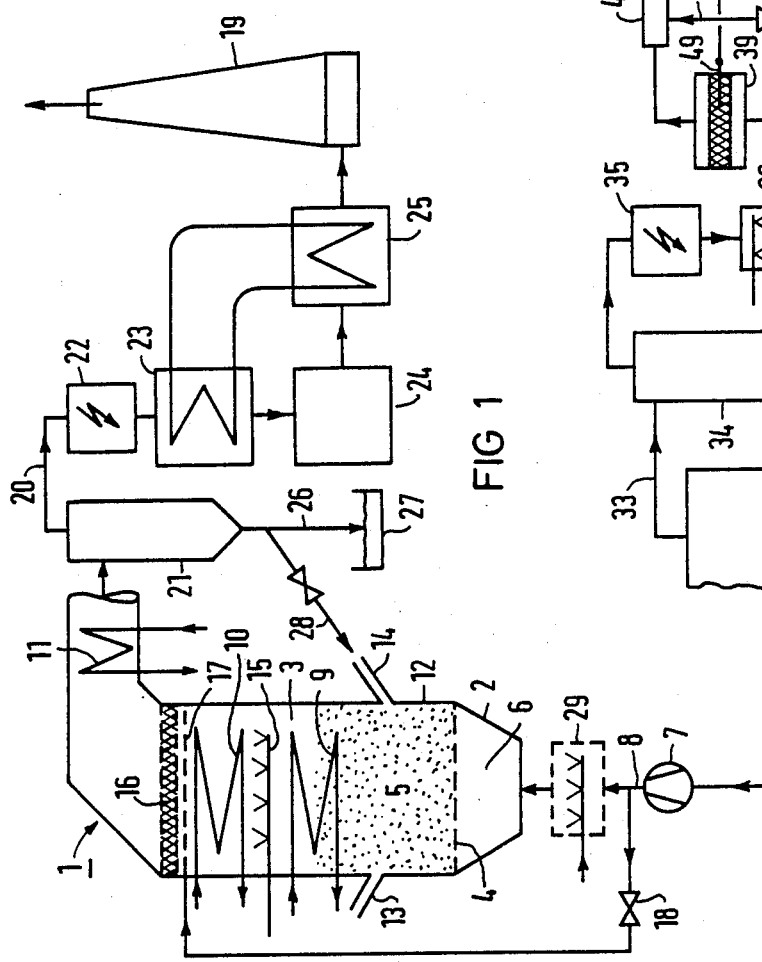
FIG. 1 is a diagrammatic and schematic view of a fluidized bed combustion plant with a device for reducing nitrogen oxides in accordance with the invention.

Referring now to the drawing and first, particularly to FIG. 1 thereof, there is shown a combustion plant 1 with a fluidized bed firebox. A nozzle plate or floor 4, above which a fluidized bed 5 is located, can be seen in a housing 2 of a combustion chamber 3. A combustion air conduit 8 supplied by a fresh air compressor 7 terminates in a chamber 6 located below the combustion chamber 3. A superheater heating surface 9, an evaporator heating surface 10 and an economizer heating surface 11 are located in the combustion chamber 3 above the fluidized bed 5. Two flue supply inlet unions 13, 14 extend into the outer wall 12 of the combustion chamber at the level of the fluidized bed 5. An injection device 15 for a reducing agent, ammonia in the case at hand, is located between the superheater heating surface 9 and the evaporator heating surface 10. Above the evaporator heating surface 10, a catalyst 16 is installed in the combustion chamber 3 so that it covers the entire cross section of the combustion chamber with the same thickness. An injection device 17 for fresh air is provided in the combustion chamber 3 of the combustion plant 1 between the evaporator heating surface 10 and the catalyst 16. The injection device 17 is connected to the combustion air conduit 8 via a control valve 18. Connected in succession on the gas-discharge side in a flue gas conduit 20 leading from the combustion plant 1 to a chimney 19 are a precipitator 21, an electrostatic filtering installation 22, a first heat exchanger 23, a flue gas desulfurization installation 24 and a second heat exchanger 25. An ash discharge conduit 26 of the precipitator 21 terminates in a container 27. Via a recirculating conduit 28, the ash discharge conduit 26 is also connected to the fuel supply inlet unions 13, 14 inserted in the outer walls of the combustion chamber 3. In the exemplary embodiment, the catalyst 16 is formed of a plurality of metal meshes of a chrome-nickel-steel alloy disposed on top of each other and extending over the entire cross section of the combustion chamber 3. In place of the meshes, a bulk pile of metal chips of an appropriate alloy and of nickel chips, respectively, contained between two diaphragms, could be used.

During operation of the combustion plant 1, combustion air is blown via the fresh air compressor 7 into the fluidized bed 5 from below, through the nozzle floor 4. At the same time, finely ground coal is introduced into the fluidized bed 5 via the fuel supply inlet unions 13, 14 in accordance with the consumption. In a conventional manner, the combustion air stirs up the introduced coal dust. At the prevailing temperatures, the atmospheric oxygen, which is at approximately 800° C. to 1,000° C., oxidizes the fuel particles. The heat thus generated is utilized in the several heating surfaces 9, 10, 11 for heating feed water, for generating steam and for superheating the generated steam.

The ammonia injected between the superheater heating surface 9 and the evaporator heating surface 10 reacts, at the temperatures of more than 800° C. existing in this region, with the nitrogen oxides already formed, and partially reduces them to nitrogen and water vapor. This reaction is increased to such an extent at the surface during the passage over the catalyst 16 installed in the combustion chamber 3 that there are practically no nitrogen oxides left in the flue gas downstream of the catalyst. The oxygen, if any, still contained in the flue gas, is consumed during the oxidation into water vapor of the hydrogen which is liberated during the separation of the ammonia. This highly exothermic reaction leads to a further heating of the catalyst 16 and of the flue gas flowing through it. The injection of air is regulated or adjusted by means of the control valve 18 so that all the formed hydrogen is consumed.

The dust and ash particles are separated from the flue gases in the precipitator 21 arranged downstream from the combustion plant 1. These separated dust and ash particles are partly directed into the combustion chamber 3 via the recirculating conduit 28 and, to lesser extent, partly into the container 27. Because of the partial recirculation, the average dwelling time of the fuel particles in the fluidized bed can be increased and, thus, their complete combustion improved. The remaining dust particles are retained in the electrostatic filter 22 downstream from the precipitator 21. The flue gases flowing towards the flue gas desulfurization installation 24 are cooled to approximately 150° C. in the first heat exchanger 23 downstream. In the flue gas desulfurization installation 24, the flue gases are freed of sulfur-containing components in a conventional manner. Downstream of the flue gas desulfurization installation 24, the cleansed flue gases, which leave the flue gas desulfurization installation at a temperature of approximately 65° C., are again heated to a temperature of approximately 100° C. to 120° C. in the second heat exchanger 25 by means of the heat recovered in the first heat exchanger 23 before entering the chimney 19. This reheating is required in order to maintain the draft needed in the chimney 19.

It is a special advantage of this construction of the combustion plant that a separate voluminous large-size installation for cleansing the flue gas of nitrogen oxides is not needed in the flue gas conduit. Instead, only a catalyst layer, an ammonia injection device 15 and an air injection device 17 have to be provided in the combustion chamber 3 of the combustion plant 1. By means of the catalyst 16, the nitrogen oxides are reduced at high temperatures of from 800° C. to 1,300° C. to nitrogen and water by the injected ammonia as reducing agent. Furthermore, the excess portion of ammonia is split into nitrogen and hydrogen at the surfaces of the catalyst and, depending upon the amount of excess oxygen, the hydrogen gas created during the separation of the ammonia is oxidized into water vapor. The additional injection of fresh air assures that sufficient oxygen to oxidize all of the hydrogen formed into water vapor is present and, at the same time, to release sufficient heat at the catalyst 16 so that its surface temperature cannot fall below 800° C.

In a variation of the exemplary embodiment of FIG. 1, it is also conceivable not to install the injection device 29 for the reducing agent in the combustion chamber 3 but rather in the combustion air conduit 8 leading to the combustion chamber as indicated by broken lines in FIG. 1. In the last-mentioned case the injected ammonia reaches the fluidized bed 5 together with the combustion air via the nozzle floor 4. This variation in the exemplary embodiment of FIG. 1 has the advantage that retrofitting of existing power plants can be accomplished in a relatively simple manner. In this case, however, assurance must be provided that the temperature of 800° C. required for the separation and oxidizing of the nitrogen is not reached or exceeded anywhere in the fluidized bed 5, because if this should happen, an increase instead of a decrease of the nitrogen oxides in the flue gas results.

Figure 2:
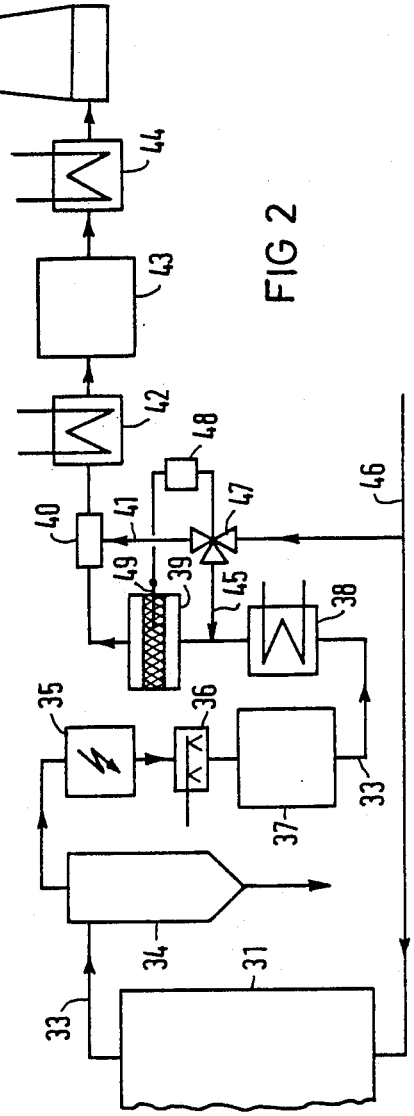
FIG. 2 is a diagrammatic and schematic view of another combustion plant with a device for reducing nitrogen oxides installed in a flue gas conduit.

FIG. 2 illustrates another embodiment of the device for reducing nitrogen oxides which can be connected to any combustion plant 31. The combustion plant has therefore only been indicated diagrammatically in FIG. 2. Arranged serially in the direction of flow in the flue gas conduit 33 exiting the combustion installation 31 and leading to the chimney 32 are a precipitator 34, an electrostatic filter 35, an ammonia injection device 36, a catalyst 37 for removing nitrogen oxide, a first heat exchanger 38, an iron-nickel catalyst 39 according to the invention, a combustion chamber 40 with a combustion air conduit 41, a second heat exchanger 42, a flue gas desulfurization installation 43 and a third heat exchanger 44. Between the first heat exchanger 38 and the iron-nickel catalyst 39, the flue gas conduit 33 is provided with a connection 45 to the combustion air conduit 46 leading to the combustion plant 31. A control valve 47 is contained in this connection 45 and is controlled via a measuring amplifier 48 which receives its control signals from a temperature sensor 49 installed in the iron-nickel catalyst 39.

During operation, this combustion plant 31, which can also be a slag tap firing installation, the flue gases containing nitrogen oxide flow via the precipitator 34 and the electrostatic filter 35, where they are freed of dust particles, into the ammonia injection device 36. Ammonia is admixed to the flue gases in this ammonia injection device 36 prior to the flue gases being directed to a catalyst 37 containing titanium and/or vanadium oxide. In the catalyst 37 for removing nitrogen oxide, the nitrogen oxides with the ammonia are changed into water vapor and nitrogen. The flue gases which have been mostly but not completely freed of nitrogen oxides are heated to above 700° C. in the first heat exchanger downstream from the catalyst 37 for removing nitrogen oxide and are enriched with atmospheric oxygen via the connection 45 to the combustion air conduit 46 before being directed to the iron-nickel catalyst 39. This iron-nickel catalyst 39 is constructed as has been described with respect to the exemplary embodiment of FIG. 1. In this iron-nickel catalyst 39, the nitrogen oxides are reduced while the ammonia is separated and the excess hydrogen liberated during the separation of the ammonia is oxidized with the atmospheric oxygen to water. The heat released by this heats the iron-nickel catalyst 39. To avoid overheating of the iron-nickel catalyst 39 when an upper temperature limit has been reached, the temperature sensor 39, via the measuring amplifier 48, connected in series, controls the control valve 47 disposed in the connection 45 and connected to the combustion air conduit 46, by reducing the flow cross section therethrough. If, because of the overheating of the catalyst, insufficient combustion air was added to oxidize the entire amount of hydrogen freed during the separation of the ammonia, the amount of air which is lacking is supplied via the combustion air conduit 41 in the combustion chamber downstream of the catalyst. This is best done by making the control valve 47 a three-way valve, one of its branches being connected to the connection 45 and the other to the combustion air conduit 41.

Because of the temperatures in excess of 700° C. present at the outlet of the catalyst, the air directed into the combustion chamber 40 immediately burns with the remaining hydrogen and heats the flue gases. These hot flue gases are cooled to approximately 150° C. in the steam generator 42 downstream from the combustion chamber 40 before they flow into the flue gas desulfurization installation 43. The warm flue gases flowing from the flue gas desulfurization installation 43 and now having a temperature of approximately 65° C. are heated in the heat exchanger 44 downstream therefrom by the steam from the second steam generator 42 before reaching the chimney 32. It is a great advantage of this device for reducing nitrogen oxides that the fractious of nitrogen oxides and ammonia normally reaching the atmosphere together with the cleansed flue gases as a result of the unavoidable slippage in conventional catalysts for removing nitrogen oxides can be reduced almost totally in the iron-nickel catalyst of the invention connected downstream. The extent of nitrogen oxide removal can therefore be clearly improved and the escape of ammonia even further reduced.

The foregoing is a description corresponding in substance to German Application No. P 36 33 285.2, dated Sept. 30, 1986, the International priority of which is being claimed for the instant application, and which is hereby made part of this application. Any material discrepancies between the foregoing specification and the aforementioned corresponding German application are to be resolved in favor of the latter.

There is claimed:

1. A combustion plant having a device for reducing nitrogen oxides in flue gases, comprising a combustion chamber, an injection device disposed in said combustion chamber for injecting a gaseous reducing agent in the form of at least one of the gases ammonia, carbon monoxide and hydrogen, and a catalyst arrangement disposed downstream of the injection device in flow direction of the flue gases, and being formed with a catalyst in said combustion chamber being heated to at most 1,300° C. and being formed of a metal alloy containing elements of the iron group subjectible to a flue gas temperature in excess of 600° C.

2. A combustion plant according to claim 1, wherein said metal alloy has an additive formed of chromium.

3. A combustion plant according to claim 1, wherein the catalyst is formed at least predominantly of nickel.

4. A combustion plant according to claim 1, wherein the catalyst consists of material shaped as wires.

5. A combustion plant according to claim 1, wherein the catalyst consists of material shaped as chips.

6. A combustion plant according to claim 1, wherein the catalyst consists of material shaped as mesh.

7. A combustion plant according to claim 1, wherein the catalyst contains an oxide of at least one of the metals iron, nickel and chromium.

8. A combustion plant according to claim 1, also comprising a fluidized bed.

9. A combustion plant having a device for reducing nitrogen oxides in flue gases, comprising a flue gas conduit, an injection device disposed in said flue gas conduit for injecting a gaseous reducing agent in the form of one of the gases ammonia, carbon monoxide and hydrogen, a heat source downstream of said injection device in the flow direction of the flue gases for heating the flue gases to a temperature above 600° C., a catalyst arrangement downstream of said heat source in said flue gas conduit, said catalyst arrangement having a catalyst being heated to at most 1,300° C. and being formed of a metal alloy containing elements of the iron group subjectible to the flue gas temperature, and a chimney downstream of said catalyst.

10. A combustion plant according to claim 9, wherein said metal alloy has an additive formed of chromium.

11. A combustion plant according to claim 9, wherein the catalyst is formed at least predominantly of nickel.

12. A combustion plant according to claim 9, wherein the catalyst consists of material shaped as wires.

13. A combustion plant according to claim 9, wherein the catalyst consists of material shaped as chips.

14. A combustion plant according to claim 9, wherein the catalyst consists of material shaped as mesh.

15. A combustion plant according to claim 9, wherein the catalyst contains an oxide of at least one of the metals iron, nickel and chromium.

16. A combustion plant according to claim 9, also comprising a fluidized bed.

* * * * *